UNITED STATES PATENT OFFICE.

FRANZ SLAMA AND HANS WOLF, OF LUDWIGSHAFEN-ON-THE-RHINE, GERMANY, ASSIGNORS TO GENERAL CHEMICAL COMPANY, OF NEW YORK, N. Y., A CORPORATION OF NEW YORK.

OXIDATION OF SULFUR DIOXID AND CATALYST THEREFOR.

1,371,004.     Specification of Letters Patent.     Patented Mar. 8, 1921.

No Drawing.     Application filed October 9, 1914. Serial No. 865,807.

*To all whom it may concern:*

Be it known that we, FRANZ SLAMA and HANS WOLF, citizens, respectively, of Austria and Germany, both residing at Ludwigshafen-on-the-Rhine, Germany, have invented certain new and useful Improvements in Oxidation of Sulfur Dioxid and Catalyst Therefor, of which the following is a specification.

This invention relates to the production and use of a commercially efficient catalyst or contact substance for the production of sulfuric anhydrid from sulfur dioxid and oxygen.

In United States Patent No. 687,834 is described a substance of the general class of vanadium catalysts; however, the product of that patent does not convert more than 84% of the sulfur dioxid into sulfuric anhydrid, which makes it useless for commercial purposes.

Now, we have discovered a new vanadium catalyst which effects conversion of sulfur dioxid and oxygen into sulfuric anhydrid to an extent of 96% and over of the contained sulfur dioxid.

Broadly considered, this invention consists in providing a carrier for a vanadium containing substance, which carrier has a fineness of division very much greater than that of similar carriers heretofore employed. So far as we are aware no vanadium catalysts have been used or described in which the carrier was less than 5000 microns in maximum dimension. As such carriers we have used ground pumice, kieselguhr, precipitated silicic acid, stannic oxid, or stannic hydroxid, or mixtures of all or any of them; we prefer to employ these materials of a degree of fineness such that the individual particles do not exceed twenty microns and are preferably in the neighborhood of one micron in diameter, although we are not limited to degrees of fineness falling within such limits, as coarser particles of carrier may be used and a large increase of conversion still be obtained. When we speak in our claims of a carrier very finely divided we mean to indicate a carrier in the here defined finely divided form, that is to say so much finer than those hitherto employed for vanadium catalysts that the catalyst of which it forms a part produces or is suited to produce, a commercially substantial increase of conversion over those hitherto known; but not so coarse that it is not capable of granulation. Particles of carrier should, therefore, not have a diameter larger than sixty (60) microns.

In developing this feature of the invention we have discovered several collateral or subsidiary new steps in the production of a suitable vanadium catalyst; for example, the addition of potassium hydrate or sodium hydrate, or the carbonate or the sulfate or the nitrate of these, in order to protect the new catalyst from deteriorating in catalytic activity; finally, the removal of hygroscopic properties by heating such catalyst in the presence of air and in the absence of sulfur dioxid.

The form in which we use the vanadium may be that of vanadic oxid or of ammonium vanadate, or of potassium vanadate, with or without, as the case may be, the addition of potassium or sodium hydrate, carbonate, sulfate, or nitrate, so as to stabilize the catalyst by overcoming any hygroscopic properties which it may possess.

It is possible, and in fact likely, that the potassium or sodium hydrate may lose its water upon heating and be present in the catalyst in the form of potash or soda. When we speak in our claims of potash we intend to cover potassium oxid and potassium hydrate as the case may be, as well as the other equivalent substances referred to.

This new catalytic substance, however prepared, may, if occasion requires, be commingled with a suitable binding agent and then molded or pressed into any desired shape. The substance may then be treated for some time in gases containing sulfur dioxid, for instance in burner gases, since this has a binding effect upon the small particles and assists in rendering the catalyst more stable. Should the catalyst, after being heated by sulfur dioxid gases, be hygroscopic, this property can be diminished or removed by subsequently heating it in the presence of air and in the absence of sulfur dioxid.

In the following examples we illustrate how this invention can be carried into effect, but we wish to be distinctly understood as not being limited to the precise conditions therein set out, since these may be varied within considerable limits without departing from the spirit of this invention while obtaining the full benefit and value of this invention. The parts are by weight:

Example 1: Mix 200 parts of moist pumice powder (the grains of which have a diameter of one micron) with 14 parts of ammonium vanadate; granulate this mixture and heat the resulting granular product to about 300° C. in the presence of air until ammonia is no longer given off, and then heat to 440° C. in the presence of gas containing or consisting of sulfur dioxid, until substantially no further change in the condition of the particles takes place. This product is now ready for use as a catalyst in the production of sulfuric anhydrid from gases containing sulfur dioxid and oxygen in the usual contact or catalytic process. Any other suitable carrier may be used in place of the pumice if in sufficiently finely divided condition.

Example 2: Mix 316 parts of kieselguhr (either as it occurs in nature or after trituration) which may previously have been heated to a red heat, with an aqueous solution of 50 parts ammonium vanadate and 56 parts of potassium hydrate; thereupon evaporate off so much of the water that the remainder can be formed into granules; place this result in a furnace and heat at 480° C. with gas containing sulfur dioxid and oxygen (such as can be obtained from a pyrites burner) and then, if desired, continue the heating for some time in a current of air; the product of this operation is a catalytic agent which is ready for use in the same manner as the product in Example 1.

The catalyst produced by Examples 1 and 2 is employed for the manufacture of sulfuric anhydrid in the usual manner, namely by bringing into contact with it both sulfur dioxid and oxygen.

We claim:

1. As a new composition of matter, a catalytic agent containing vanadium in chemical combination distributed on a very finely divided carrier not exceeding sixty microns in diameter.

2. As a new composition of matter, a shaped catalytic agent containing vanadium in chemical combination distributed on a very finely divided carrier not exceeding sixty microns in diameter.

3. As a new composition of matter, a catalytic agent containing vanadic oxid distributed on a very finely divided carrier not exceeding sixty microns in diameter.

4. As a new composition of matter, a catalytic agent containing vanadic oxid and potash distributed on a very finely divided carrier not exceeding sixty microns in diameter.

5. The improvement in the art of making sulfuric anhydrid which consists in causing sulfur dioxid and oxygen to come into contact with a catalytic agent comprising vanadium in chemical combination distributed on a very finely divided carrier not exceeding sixty microns in diameter.

6. The improvement in the art of making sulfuric anhydrid which consists in causing sulfur dioxid and oxygen to come into contact with a catalytic agent comprising vanadic oxid distributed on a very finely divided carrier not exceeding sixty microns in diameter.

7. The improvement in the art of making sulfuric anhydrid which consists in causing sulfur dioxid and oxygen to come into contact with a catalytic agent containing vanadic oxid and potash, which agent has previously been heated in the presence of air and in the absence of sulfur dioxid.

8. The improvement in the art of making sulfuric anhydrid which comprises treating a catalytic agent which comprises treating a very finely divided carrier not exceeding sixty microns in diameter with a salt of vanadic acid and then heating the same in the presence of air and in the absence of sulfur dioxid.

In testimony whereof we have hereunto set our hands in the presence of two subscribing witnesses.

FRANZ SLAMA.
HANS WOLF.

Witnesses:
H. MERLE COCHRAN,
ALBERT TAG.

DISCLAIMER 1,371,004.—*Franz Slama* and *Hans Wolf,* Ludwigshafen-on-the-Rhine, Germany. OXIDATION OF SULFUR DIOXID AND CATALYST THEREFOR. Patent dated March 8, 1921. Disclaimer filed April 13, 1934, by the assignee, *The General Chemical Company.*

Enter its disclaimer to the subject-matter of claim 7 of said Letters Patent, to wit:

"7. The improvement in the art of making sulfuric anhydrid which consists in causing sulfur dioxid and oxygen to come into contact with a catalytic agent containing vanadic oxid and potash, which agent has previously been heated in the presence of air and in the absence of sulfur dioxid."

[*Official Gazette May 8, 1934.*]